June 26, 1928. 1,675,029
J. H. JAMES
METHOD OF PRODUCING OXIDATION PRODUCTS FROM GASEOUS HYDROCARBONS
Original Filed Nov. 21, 1916
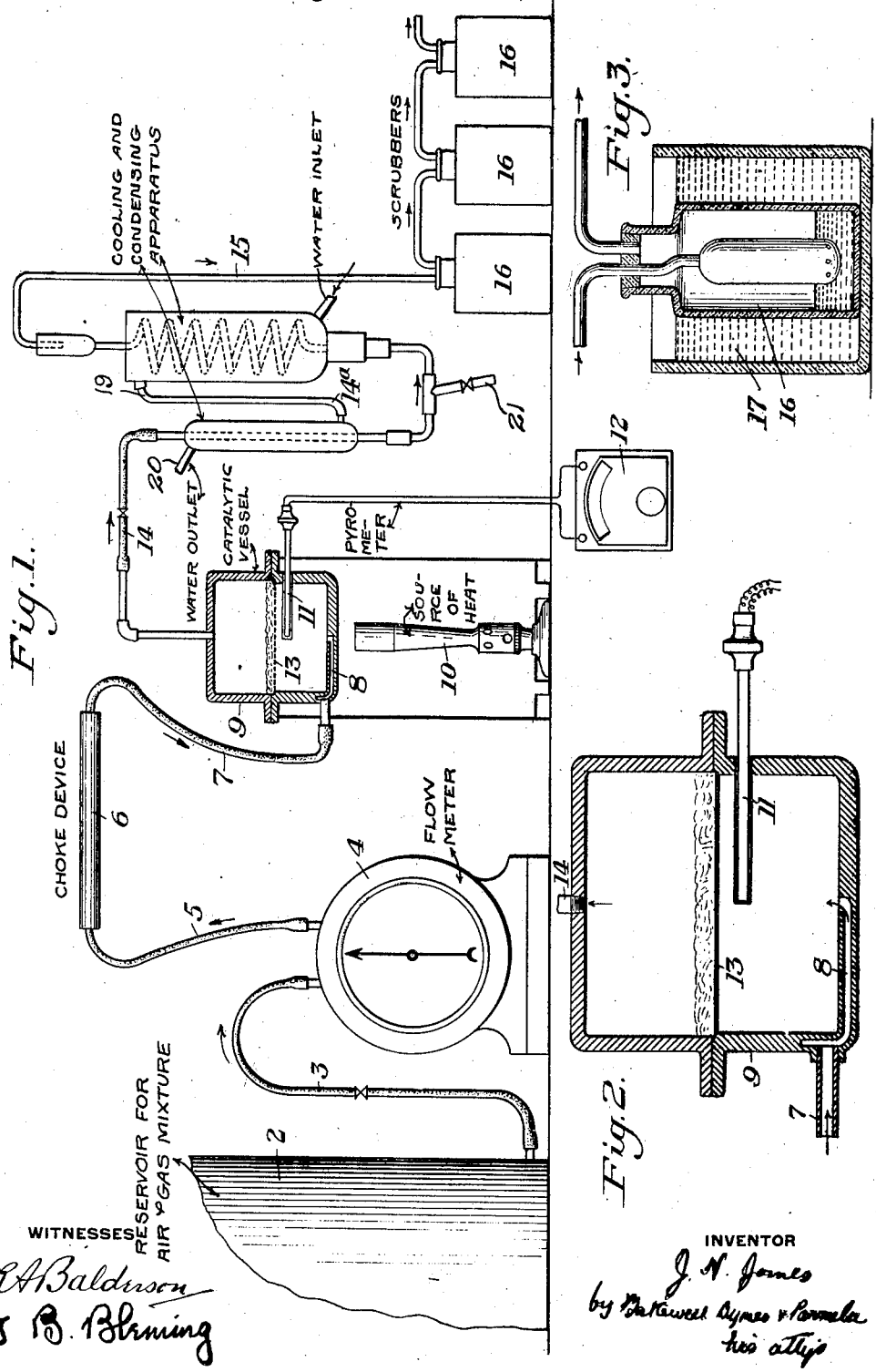

Patented June 26, 1928.

1,675,029

UNITED STATES PATENT OFFICE.

JOSEPH HIDY JAMES, OF PITTSBURGH, PENNSYLVANIA, ASSIGNOR, BY DIRECT AND MESNE ASSIGNMENTS, TO CLARENCE P. BYRNES, OF PITTSBURGH, PENNSYLVANIA, TRUSTEE.

METHOD OF PRODUCING OXIDATION PRODUCTS FROM GASEOUS HYDROCARBONS.

Application filed November 21, 1916, Serial No. 132,570. Renewed March 28, 1925.

Figure 1 is a side elevation, partly in section, showing one form of apparatus for carrying out my invention.

Figure 2 is an enlarged section through the catalytic vessel, and

Figure 3 is a sectional side elevation of one of the absorbers.

My invention relates to the manufacture of oxidation products from gaseous hydrocarbons and is designed to provide useful products by a partial oxidation thereof which is so controlled as not to reach a complete combustion stage.

As is well known, when hydrocarbons which are gaseous at ordinary temperatures and pressures, such as methane, ethane, propane and butane which are present in natural gas, are mixed with air in certain proportions and ignited, a nearly complete or a complete combustion takes place, the main products being carbon dioxide, carbon monoxide, steam, soot, etc., the proportion of these products depending upon the temperature, the proportion of air supplied etc.

As the result of a long series of experiments, I have discovered that if air or oxygen in some form be mixed with gaseous hydrocarbons in such proportions as to give a non-explosive mixture, and the mixture brought in contact with certain kinds of catalytic material, under proper temperature and gas velocity conditions, the reactions can be so controlled as to carry the oxidation of the hydrocarbon to a point short of complete combustion, thus giving intermediate products such as aldehydes and acids.

The catalyzer causes the oxygen under these conditions to attack the hydrocarbons, carrying the oxidation to an intermediate stage, such as the aldehyde stage. It will be understood that if the percentage of oxygen or air is outside of the proper range for this process, the oxidation will be carried to the point of self-sustained combustion which should be avoided; and by keeping the percentage of air within the proper range hereinafter referred to, I can prevent self-sustained combustion occurring.

The catalyzers that possess this remarkable property, and which I have thus far tested, are the oxides of molybdenum, vanadium, manganese, tungsten and uranium, together with mixtures of these oxides with each other, or mixtures of these oxides with other metallic oxides; and compounds of these oxides, such, for example, as molybdenum vanadate, cobalt molybdate, manganese molybdate, etc.

My investigations have led me to believe that this remarkable property is possessed by the oxides and compounds of high melting point, electronegative, low atomic volume metals, such as given in the Lothar, Meyer atomic volume diagram, shown, for example, on page 62 of volume 2 of the 1907 edition of Roscoe & Schorlemmer's Treatise on Chemistry. In this diagram, the metals whose oxides and compounds which I wish to include in my broader claims are on the descending side of the peaks beginning with the third peak of said diagram and including such metals as titanium, vanadium, chromium, manganese, zirconium, niobium or columbium and molybdenum. In other treatises than the one above referred to, the diagram has been further developed so that the extension of the diagram includes thorium, tungsten, and uranium in the same classification. See Cavin & Lander Systematic Inorganic Chemistry, 1907 edition, page 32 diagram. If I employ more than one of these oxides, I preferably mix the oxides of such metals with each other, or the compounds of each other, though as above stated, I may mix them with other metallic oxides. I have tested the molybdates of manganese and cobalt and also molybdenyl molybdate, and find that they possess this peculiar property which is probably possessed by other compounds of high melting point, electronegative, low atomic volume metals. The oxides or compounds of these metals are non-volatile at the temperatures which I employ, and in my process, the temperature is kept below the volatilizing point of such oxides or compounds.

With a catalyst consisting of the oxides of molybdenum produced by partial reduction of molybdenum trioxide, and using methane as the hydrocarbon, the desired reaction is very faint at 300° C.; is noticeable at 400° C.; measurable at 500° C.; with moderate gas velocities the reaction is very active at 550° C.; and with higher gas velocities a temperature as high as 600° C. to 700° C. can be used.

I have further found that although the aldehydic oxidation of methane can be obtained at 450° C. to 500° C. with little or no carbon dioxide formation, the percentage of conversion in one passage through the catalytic mass is very low, amounting only to a few tenths of one per cent. The best yields so far obtained, were with gas and air mixtures (having more than 16% methane, in order, in this experiment, to keep outside the explosive range which is from 4% to 15%) at temperatures from 530 to 700° C. In the latter case the percentage of conversion is higher, but is always accompanied by a carbon dioxide formation. The percentage of methane passing into carbon dioxide can, however, be lowered, and the percentage passing into formaldehyde increased to as much as one-twentieth of the total, by increasing the velocity of the gas mixture through the catalytic mass. These facts appear to show that the oxidation, in the presence of the catalyzers at least, is progressive, the formaldehyde stage definitely preceding the acid and the carbon dioxide stage.

I will now describe one form of my apparatus and the method used therewith.

In the drawings, 2 represents a reservoir of mixed air and gas under slight pressure, from which the mixture passes through a valved pipe 3 to a gas meter 4. From the meter the mixture passes through a choke device 6, to prevent back firing, into pipe 7 and thence into the inlet passage 8 of the catalytic vessel 9. This inlet passage is preferably arranged as shown, so that the mixture will be heated before entering the catalytic chamber. The vessel is heated by any suitable means as, for example, a gas burner, or burners 10, the temperature being carefully regulated to give the desired partial oxidation result. For this purpose, I show a pyrometer couple 11 in the catalytic vessel, extending through its wall and having wires leading to the external temperature indicator 12. This catalytic chamber is preferably provided with a diaphragm 13 of wire gauze on which rests a layer of loose catalytic material, such as above named.

As the gaseous mixture passes through this catalytic material under the regulated temperatures above referred to, the hydrocarbon will be partially oxidized to an intermediate stage short of complete combustion, such as the aldehyde stage.

The mixture then passes from this vessel through a valved pipe 14 to a cooler and condensing apparatus 14ª of any desirable type having a tap-off, such as shown. In this apparatus as shown, cooling water enters the right hand vessel through pipe 18, passes upwardly around the coil pipe therein and thence through pipe 19 to the lower end of the other cooling vessel, and after rising around the cooling pipe therein passes out through outlet pipe 20. The valve tap-off is indicated at 21. From this condensing apparatus, the uncondensed remainder passes through the pipe 15 and into a series of absorption vessels 16. These vessels are preferably arranged in the general manner shown in Figure 3, the gas entering each one below the surface of the liquid and the surplus passing over to the next absorption vessel. I have shown each of these absorption wells as surrounded by a water jacket 17.

By such an apparatus, operated as above described, the partial oxidation products may be obtained, but in order to operate this commercially, it will be desirable for the reasons above given, to pass the mixture of gaseous hydrocarbon and air through a series of these units, each made up of a catalyzing apparatus and the necessary absorption, or condensing and absorption vessels, in order to obtain the desired yield of the intermediate products such as aldehydes. The remainder will pass into carbon dioxide and flow out unchanged with the exit gas.

Where the gaseous hydrocarbon is methane, the reactions are as follows:

1. Formaldehyde formation:

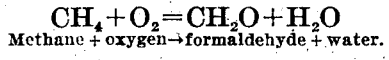

2. Carbon dioxide formation:

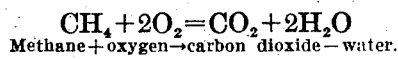

The treatment of the products issuing from the catalytic apparatus depends on the particular gaseous hydrocarbon treated. With methane, the formaldehyde and steam produced, together with all the other constituents of the gas stream, are cooled, condensing the steam. In this way part of the formaldehyde is obtained in the water of condensation by absorption and the additional absorption vessels containing water serve to recover the greater part of the formaldehyde which remains in the gas stream. These solutions of formaldehyde in water may be concentrated by various means well known to industrial chemists, in order to obtain a solution of commercial strength.

Other methods of recovering formaldehyde may be used as, for example, by passing the exit gas mixture into absorbers containing a saturated solution of sodium acid sulphite, and later decomposing the formaldehyde-sulphite compound by well known chemical means and recovering a water solution of formaldehyde.

With heavier gaseous hydrocarbons, the aldehydes can be recovered in most cases by condensation, and in all cases by condensation followed by absorption. My process may be used with any hydrocarbons or hydrocarbon derivatives or compounds which are in gaseous form when the air or oxygen-containing gas is mixed therewith.

The advantages of my invention will be obvious to industrial chemists, since a number of valuable industrial products can be obtained by this simple and effective method.

While my method relates principally to the formation of aldehydes, yet by suitably varying the depth of the catalytic layer, the temperature and the pressure in the system and the rate of air supplied, other valuable intermediate oxidation products may be obtained. For example, in many of the formaldehyde experiments, formic acid up to one-tenth of the total methane oxidized, was obtained.

The claims in this application are limited to the oxidation of hydrocarbons which are gaseous at normal temperatures and pressure. The broader claims to partial oxidation of hydrocarbons appear in my co-pending application Serial No. 272,567 filed January 22, 1919.

Many changes may be made in the apparatus employed, the particular catalytic mass used etc., without departing from my invention.

I claim:

1. In the method of making partial oxidation products, the steps consisting of passing a mixture stream containing oxygen and hydrocarbon which is gaseous at normal temperatures and pressures over a catalyst, and maintaining the reaction temperature below that of continuously self-sustained combustion and within the partial combustion range below the volatilizing point of the catalyst.

2. In the method of making partial oxidation products from a hydrogen-carbon stream containing hydrocarbons which are gaseous at normal temperatures, and pressures, the steps consisting of feeding a mixture of the same with an oxygen-containing gas into contact with catalytic material, and maintaining the reaction zone temperature below the volatilizing temperature of the catalyst.

3. In the manufacture of partial oxidation products, the steps consisting of maintaining a reaction zone at a temperature below that of self-sustained combustion and within the partial oxidation range for the mixture used, and passing through said zone a mixture of oxygen-containing gas and a hydrocarbon which is gaseous at normal temperatures and pressures in proportions outside the explosive range and at such a speed relative to the zone that the time of sojourn of the mixture therein is relatively short.

4. In the manufacture of partial oxidation products, the steps consisting of maintaining a catalyst at a temperature below that of self-sustained combustion and within the partial oxidation range for the mixture used, and passing in contact with said catalyst a mixture of oxygen-containing gas and a hydrocarbon which is gaseous at normal temperatures and pressures in proportions outside the explosive range and at such a speed relative to the catalyst that the time of sojourn of the mixture therein is relatively short.

5. In the manufacture of partial oxidation products, the steps consisting of maintaining a reaction zone at a temperature below about 550° C. and within the partial oxidation range for the mixture used, and passing through said zone a mixture of oxygen-containing gas and a hydrocarbon which is gaseous at normal temperatures and pressures in proportions outside the explosive range, and extracting products from the tail gas.

6. In the manufacture of partial oxidation products, the steps consisting of maintaining a catalytic reaction zone at a temperature below about 550° C. and within the partial oxidation range for the mixture used, and passing through said zone in contact with the catalyst therein a mixture of oxygen-containing gas and a hydrocarbon which is gaseous at normal temperatures and pressures in proportions outside the explosive range, and extracting products from the tail gas.

7. In the manufacture of partial oxidation products, the steps consisting of maintaining a reaction zone at a temperature below about 400° C. and within the partial oxidation range for the mixture used, and passing through said zone a mixture of oxygen-containing gas and a hydrocarbon which is gaseous at normal temperatures and pressures in proportions outside the explosive range, and extracting products from the tail gas.

8. In the manufacture of partial oxidation products, the steps consisting of maintaining a catalytic reaction zone at a temperature below about 400° C. and within the partial oxidation range for the mixture used, and passing through said zone in contact with the catalyst therein a mixture of oxygen-containing gas and a hydrocarbon which is gaseous at normal temperatures and pressures in proportions outside the explosive range, and extracting products from the tail gas.

9. The method of making intermediate oxidation products from hydrocarbons which are gaseous at normal temperatures and pressures, consisting in passing the gaseous stream containing oxygen and containing said gaseous hydrocarbons to a percentage greater than that within the explosive range through a catalytic layer containing a compound of a high-melting-point low-atomic volume electronegative metal at a temperature below the volatilizing point of said metal compound and at such temperature and velocity (higher with higher temperatures) that intermediate partial combustion products may be recovered.

10. The method of making intermediate oxidation products from hydrocarbons which are gaseous at normal temperatures and pressures, consisting in passing a gaseous stream containing said gaseous hydrocarbons and oxygen in relative percentages outside the explosive range in contact with a catalytic layer containing a compound of a high-melting-point low-atomic volume electronegative metal at a temperature below the volatilizing point of said compound and at such a temperature and velocity (higher with higher temperatures) that intermediate partial oxidation products may be recovered.

11. The method of making intermediate oxidation products from hydrocarbons gaseous at normal temperatures and pressures, consisting of passing a stream of the gaseous hydrocarbons and oxygen through a relatively thin catalytic layer containing a compound of a high-melting point low-atomic volume electronegative metal at a temperature between 300° C. and 700° C., the temperature being below the volatilizing point of the compound with such a velocity (higher with higher temperatures) that a material proportion of intermediate oxidation products is produced.

12. The method of making intermediate oxidation products from hydrocarbons which are gaseous at normal temperatures and pressures, consisting in passing a gaseous stream containing oxygen and said gaseous hydrocarbons through a relatively thin catalytic layer containing a compound of a high-melting-point low-atomic volume electronegative metal at a temperature below the volatilizing point of the compound and at such velocity and temperature that intermediate oxidation products may be recovered, recovering products therefrom by forming chemical compounds thereof, and repeating the operations on the residual gas mixture after said recovery.

13. The method of making intermediate oxidation products from hydrocarbons which are gaseous at normal temperatures and pressures, consisting in passing a gaseous stream containing oxygen and said gaseous hydrocarbon in contact with a catalyst containing a compound of a high-melting-point, low-atomic volume electronegative metal, and maintaining the temperature conditions in the range where intermediate partial oxidation products are produced and below the volatilizing point of the said metallic compound.

14. In the method of making partial oxidation products from hydrocarbons which are gaseous at normal temperatures and pressures, the steps consisting of mixing the preheated hydrocarbon gas with an oxygen-containing gas and passing the mixture in contact with a catalyst containing a compound of a high-melting-point low-atomic volume electronegative metal at a reacting temperature below the volatilizing point of said metal compound, and recovering the products therefrom.

15. In the method of making partial oxidation products, the steps consisting of passing a mixture stream containing oxygen and hydrocarbon which is gaseous at normal temperatures and pressures over a catalyst containing a compound of a high-melting-point low-atomic-volume electronegative metal, and maintaining the reaction temperature below that of continuously self-sustained combustion and within the partial combustion range below the volatilizing point of the catalyst 16. In the manufacture of partial oxidation products, the steps consisting of maintaining a reaction zone at a temperature below that of self-sustained combustion and within the partial oxidation range for the mixture used, passing through said zone a mixture of oxygen-containing gas and a hydrocarbon which is gaseous at normal temperatures and pressures in proportions outside the explosive range and at such a speed relative to the zone that the time of sojourn of the mixture therein is relatively short, and then passing the stream through a condensing cooler and then through a scrubber.

17. In the method of making partial oxidation products from hydrocarbons which are gaseous at normal temperatures and pressures, the steps consisting of mixing the gas with an oxygen-containing gas in such proportions that the combustible gas percentage is greater than that within the explosive range, and passing the mixture in contact with a catalyst containing a compound of a metal at a reacting temperture below the voltilization point of the catalyst and at such velocity that part of the oxygen remains uncombined and present in the outlet gas.

18. In the method of making partial oxidation products from hydrocarbons which are gaseous at normal temperatures and pressures, the steps consisting of mixing the gas with an oxygen-containing gas in proportions outside the explosive range and passing the mixture in contact with a catalyst at such velocity and temperature that part of the oxygen remains uncombined and is present in the gaseous products.

19. In the method of making partial oxidation products from a hydrogen-carbon stream containing hydrocarbons which are gaseous at normal temperatures and pressures, the steps consisting of mixing the gas with an oxygen-containing gas in such proportions that the combustible gas percentage is greater than that within the explosive range of the mixture, passing the mixture through a hot reaction zone at such velocity and temperature that part of the oxygen remains uncombined and is present in the product, recovering part of the products, and again passing the unrecovered portions through a hot reaction zone, and maintaining said zone at a temperature within the range to produce intermediate oxidation products.

In testimony whereof, I have hereunto set my hand.

JOSEPH HIDY JAMES.